W. STAFFORD.
BALL AND SOCKET PIPE UNION.
APPLICATION FILED MAR. 29, 1911.
1,076,921.
Patented Oct. 28, 1913.
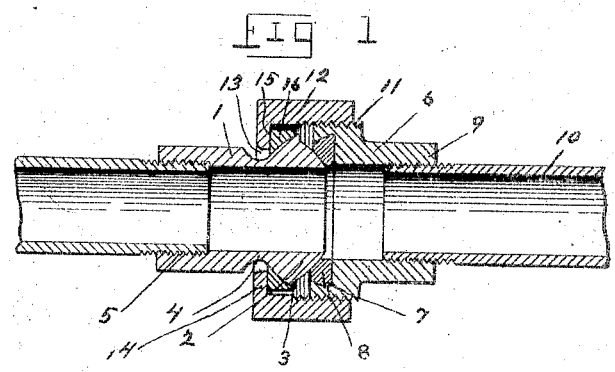
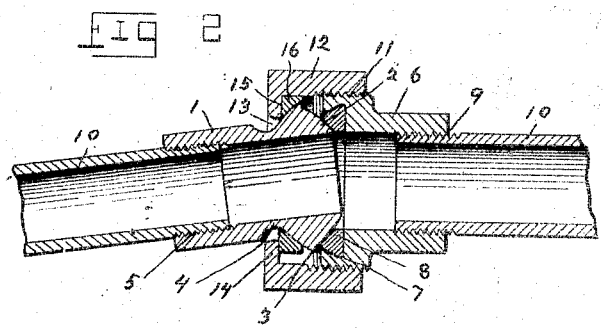
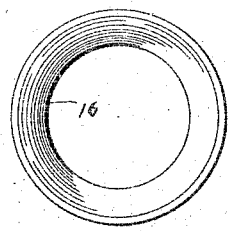
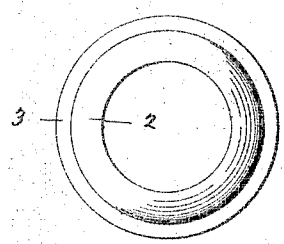
WITNESSES
B. P. Fallin
M. L. Lefevre
INVENTOR
Wayne Stafford,
BY
John J. Thompson
ATTORNEY

UNITED STATES PATENT OFFICE.

WAYNE STAFFORD, OF BLUE BALL, PENNSYLVANIA.

BALL-AND-SOCKET PIPE-UNION.

1,076,921.

Specification of Letters Patent.

Patented Oct. 28, 1913.

Application filed March 29, 1911. Serial No. 617,611.

*To all whom it may concern:*

Be it known that I, WAYNE STAFFORD, a citizen of the United States, residing at Blue Ball, in the county of Lancaster and State of Pennsylvania, have invented certain new and useful Improvements in Ball-and-Socket Pipe-Unions, of which the following is a specification, reference being had therein to the accompanying drawing.

This invention relates to a ball and socket pipe-union of that class which may be employed for use to join the end of a pipe to convey a vapor, such as steam or a liquid.

The objects of the invention are to provide a pipe-union of this class that shall be cheap, durable, efficient and consist of few parts and be easily installed, and not liable by wear, to cause leakage.

Another object of the invention is to construct a device of this kind that shall, by its novel construction, constitute a tight joint without employing any gaskets or packing of other material than metal.

Still another object is to provide a coupling that will, when being tightened, adjust itself to the angle at which the attaching pipes are set, with respect to each other.

With these and other objects in view, my invention consists in certain construction and combination of parts as will hereinafter be fully described and claimed in the annexed specification, and illustrated in the accompanying drawings, which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings: Figure 1, is a central longitudinal sectional view of my device, showing the position of the various parts when the connecting pipes are in line with each other. Fig. 2, is a similar view, showing the position of the parts when the connecting pipes stand at an angle to each other. Fig. 3, is a plan view of the adjustable packing ring. Fig. 4, is an end view of the ball-member.

Referring to the drawings, my improved union or coupling comprises the member 1, which is formed with the rounded end 2, of approximately spherical form and provided with an encircling shoulder 3, and a groove 4 forming a neck adapted to receive the flange of the collar. The member 1 is also provided with the usual internal screw threads for attachment to the pipe 5. The other member 6, is formed with a cut-under or V-shaped recess 7, in the end thereof, within which is placed a bearing ring 8, of semi-soft material, such as Babbitt or other anti-friction metal, which is formed with a seat having the same curve as, and adapted to receive the ball end 2, of the member 1. Said member 6, is further provided with the usual internal screw-threaded shank 9, for attachment to the pipe 10; and is also formed with the external screw-threads 11, for the reception of the securing collar or nut 12.

The collar or nut 12, is formed with the central orifice 13, within which is placed the member 1, and said nut 12, is also provided with the flange 14, which forms a seat 15, within said nut 12. Within said nut 12, and resting on the seat 15, is an adjustable packing ring 16, which is of less outer diameter than the interior diameter of said nut 12, so that it can adjust itself to the different positions taken by the member 1; that is, if the pipes 5, and 10, are alined as in Fig. 1, the ring 16, will be central in relation to the nut 12; and if the pipes 5, and 10, stand at an angle to each other, as shown in Fig. 2, the ring 16, will assume the position therein shown, and in this way, there will be provided a tight joint under all positions of the pipes within the limits of the coupling. With this construction, the strain on the nut 12, is even during its entire circumference, and also an even pressure is maintained by the packing ring as well.

Having thus described my invention what I claim as new and desire to secure by Letters Patent is:—

The combination in a pipe-union of the class described, of a socket member formed with an attaching shank, a cup-shaped ring of bearing material attached to the face thereof, a ball member engaging said ring, said ball member having a rounded head, a shank, a grooved neck interposed between the head and shank, and an encircling shoulder formed upon the head and spaced thereon to engage the end of the socket member adjacent the ring, a coupling nut threaded upon the socket member, said nut having an opening formed in one end thereof, the edges of said opening being curved to engage the grooved neck when the shoulder of the head engages the end of the socket member, and a curved packing ring within said coupling nut for engagement with the head, the outer diameter of said packing ring being less than the inner diameter of the coupling nut, whereby said packing ring automatically adjusts itself to different angles of the pipe union, and makes a tight packing at all times.

In testimony whereof I affix my signature in presence of two witnesses.

WAYNE STAFFORD.

Witnesses:
JOHN J. THOMPSON,
WM. J. COULTER.